(12) United States Patent
Sanchez Barajas et al.

(10) Patent No.: US 10,154,388 B2
(45) Date of Patent: Dec. 11, 2018

(54) WIRELESS DIRECTIONAL SHARING BASED ON ANTENNA SECTORS

(71) Applicant: QUALCOMM Incorporated, San Diego, CA (US)

(72) Inventors: Luis Manuel Sanchez Barajas, San Diego, CA (US); Pranav Iyengar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/266,109

(22) Filed: Sep. 15, 2016

(65) Prior Publication Data

US 2018/0077547 A1    Mar. 15, 2018

(51) Int. Cl.
| | |
|---|---|
| H04W 4/00 | (2018.01) |
| H04W 4/20 | (2018.01) |
| H04B 7/04 | (2017.01) |
| H04B 7/06 | (2006.01) |
| H04W 4/02 | (2018.01) |
| G06F 3/0488 | (2013.01) |
| H04W 88/02 | (2009.01) |

(52) U.S. Cl.
CPC .......... *H04W 4/20* (2013.01); *G06F 3/04883* (2013.01); *H04B 7/04* (2013.01); *H04B 7/0617* (2013.01); *H04B 7/0695* (2013.01); *H04W 4/023* (2013.01); *H04W 4/026* (2013.01); *H04W 88/02* (2013.01)

(58) Field of Classification Search
CPC ....... H04W 4/20; H04W 4/023; H04W 4/026; H04W 88/02; H04B 7/04; H04B 7/0617; H04N 1/00381; H04N 5/23216; H04N 1/00411; G06F 3/005; G06F 3/017; G06K 9/00335–9/00389; G06K 2009/00395
USPC .................. 455/466; 345/173–175; 715/863
See application file for complete search history.

(56) References Cited

U.S. PATENT DOCUMENTS

| | | |
|---|---|---|
| 8,547,342 B2 | 10/2013 | Stallings et al. |
| 9,253,592 B1 | 2/2016 | Moscovich et al. |
| 2011/0088002 A1 | 4/2011 | Freer |

(Continued)

FOREIGN PATENT DOCUMENTS

GB    2525902 A    11/2015

OTHER PUBLICATIONS

International Search Report and Written Opinion—PCT/US2017/047028—ISA/EPO—Nov. 20, 2017 (161926WO).

*Primary Examiner* — Kathy Wang-Hurst
*Assistant Examiner* — B. M. M. Hannan
(74) *Attorney, Agent, or Firm* — Paradice and Li LLP/Qualcomm

(57) ABSTRACT

Apparatuses and methods for sharing data between wireless devices based on one or more user gestures are disclosed. In some implementations, a wireless device may include a number of antenna elements configured to beamform signals in a plurality of transmit directions, with each of the transmit directions corresponding to one of a number of antenna sectors. Each of the antenna sectors may represent a unique set of phase shift values and gain values applied to the plurality of antenna elements, for example, so that the wireless device may beamform data transmissions in a transmit direction corresponding to a position of a target device in response to a user gesture.

15 Claims, 10 Drawing Sheets

(56) References Cited

U.S. PATENT DOCUMENTS

| | | | |
|---|---|---|---|
| 2011/0163944 A1* | 7/2011 | Bilbrey | G01D 21/02 345/156 |
| 2013/0050080 A1* | 2/2013 | Dahl | G01S 5/18 345/158 |
| 2013/0097525 A1* | 4/2013 | Kim | H04M 1/7253 715/748 |
| 2013/0169546 A1* | 7/2013 | Thomas | G06F 9/4451 345/173 |
| 2013/0222266 A1* | 8/2013 | Gardenfors | G06F 3/1446 345/173 |
| 2014/0055302 A1* | 2/2014 | Jia | H01Q 3/34 342/372 |
| 2014/0188989 A1 | 7/2014 | Stekkelpak et al. | |
| 2014/0229858 A1* | 8/2014 | Bleker | H04W 4/206 715/753 |
| 2015/0244432 A1* | 8/2015 | Wang | H04B 7/0695 375/267 |
| 2015/0288438 A1* | 10/2015 | Maltsev | H01Q 3/40 455/101 |
| 2015/0326705 A1* | 11/2015 | Garnham | G06F 3/0488 715/748 |
| 2016/0003618 A1* | 1/2016 | Boser | G01C 19/5776 73/504.12 |
| 2016/0014722 A1 | 1/2016 | Yoon et al. | |
| 2016/0065286 A1* | 3/2016 | Kim | H04B 7/0617 370/330 |
| 2016/0142965 A1* | 5/2016 | Sinha | H04B 7/0491 370/328 |
| 2016/0291696 A1* | 10/2016 | Rider | G06F 3/1454 |
| 2016/0323755 A1* | 11/2016 | Cordeiro | H04J 13/0014 |

\* cited by examiner

WIRELESS DIRECTIONAL SHARING BASED ON ANTENNA SECTORS

TECHNICAL FIELD

The example embodiments relate generally to wireless communications, and specifically to sharing data between wireless devices.

BACKGROUND OF RELATED ART

Wireless devices such as smart phones and tablet computers may share data wirelessly with one or more other devices using various wireless communication protocols. In addition, some wireless devices may transmit data to other wireless devices based on a user gesture. For example, a user may activate a data sharing application or program on a wireless device and then provide a gesture on a touch screen of the wireless device. The wireless device may transmit data to one or more target devices located in positions indicated by the direction of the gesture. The user may be prompted to select and/or confirm the target device prior to the data transmission (e.g., to ensure that the data is transmitted to the intended target device). Once the intended target device is confirmed, the wireless device may transmit the data to the target device.

The data sharing application is typically executed in the wireless device's application layer, which may not be aware of relationships between the direction of the user gesture, the spatial orientation of the wireless device, the direction of the target device relative to the wireless device, and/or the orientation of the wireless device's antenna elements. As a result, data transmissions from the wireless device based on the user gesture may not be properly directed at the intended target device, which is not desirable. Thus, there is a need to improve the accuracy with which the wireless device may transmit data to an intended target device based on a user gesture.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the disclosure are directed to apparatuses and methods for wirelessly sharing data between wireless devices. In one example, a method of communicating data from a wireless device to a target device is disclosed. The method, which may be performed by a wireless device including a number of antenna elements configured to beamform signals in a plurality of transmit directions each associated with a corresponding one of a number of antenna sectors, may include establishing a wireless connection with the target device; detecting a swipe gesture on a touch-sensitive display of the wireless device; determining that a direction of the swipe gesture on the touch-sensitive display corresponds to a current position of the target device; activating, in response to the direction of the swipe gesture, a selected one of the number of antenna sectors based on a mapping between a plurality of swipe gesture directions and the number of antenna sectors; and transmitting data to the target device using the activated antenna sector.

In another example, a wireless device configured to wirelessly share data with a target device is disclosed. The wireless device may include a touch-sensitive display, a number of antenna elements, one or more processors, and a memory configured to store instructions. The number of antenna elements may be configured to beamform signals in a plurality of transmit directions each associated with a corresponding one of a number of antenna sectors. Execution of the instructions by the one or more processors may cause the wireless device to establish a wireless connection with the target device; detect a swipe gesture on a touch-sensitive display of the wireless device; determine that a direction of the swipe gesture on the touch-sensitive display corresponds to a current position of the target device; activate, in response to the direction of the swipe gesture, a selected one of the number of antenna sectors based on a mapping between a plurality of swipe gesture directions and the number of antenna sectors; and transmit data to the target device using the activated antenna sector.

In another example, a non-transitory computer-readable medium is disclosed. The non-transitory computer-readable medium may store instructions that, when executed by one or more processors of a wireless device, may cause the wireless device to perform a number of operations. The wireless device may include a touch-sensitive display and a number of antenna elements configured to beamform signals in a plurality of transmit directions each associated with a corresponding one of a number of antenna sectors. The number of operations may include establishing a wireless connection with the target device; detecting a swipe gesture on a touch-sensitive display of the wireless device; determining that a direction of the swipe gesture on the touch-sensitive display corresponds to a current position of the target device; activating, in response to the direction of the swipe gesture, a selected one of the number of antenna sectors based on a mapping between a plurality of swipe gesture directions and the number of antenna sectors; and transmitting data to the target device using the activated antenna sector.

In another example, a wireless device configured to wirelessly share data with a target device is disclosed. The wireless device may include a touch-sensitive display and a number of antenna elements configured to beamform signals in a plurality of transmit directions, each direction corresponding to one of a number of antenna sectors. The wireless device may also include means for establishing a wireless connection with the target device; means for detecting a swipe gesture on a touch-sensitive display of the wireless device; means for determining that a direction of the swipe gesture on the touch-sensitive display corresponds to a current position of the target device; means for activating, in response to the direction of the swipe gesture, a selected one of the number of antenna sectors based on a mapping between a plurality of swipe gesture directions and the number of antenna sectors; and means for transmitting data to the target device using the activated antenna sector.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

Figure 1:
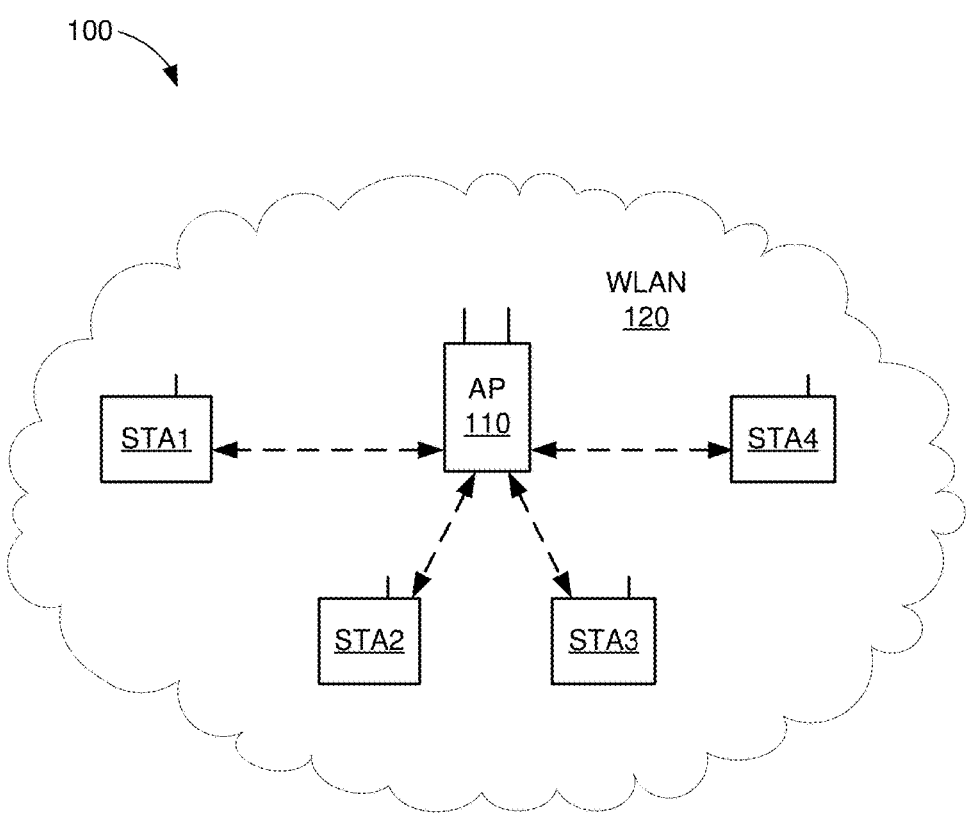
FIG. 1 depicts a wireless communication network within which the example embodiments may be implemented.

Apparatuses and methods for wirelessly sharing data between wireless devices based, at least in part, on one or more user gestures are disclosed. In some implementations, a wireless device may include a plurality of antenna elements configured to beamform signals in a number of transmit directions, with each of the transmit directions corresponding to one of a number of antenna sectors. Each of the antenna sectors may represent a unique set of phase shift values and gain values applied to the plurality of antenna elements, for example, so that the wireless device may beamform data transmissions in a transmit direction corresponding to a position of a target device. In some aspects, the transmit direction of the beamformed data transmissions may be based on a direction of a user gesture.

More specifically, for some implementations, the wireless device may detect a swipe gesture on its touch-sensitive display, and determine that the direction of the swipe gesture corresponds to the current position of the target device. The wireless device may relate the direction of the swipe gesture to one of a number of device sectors and use a mapping between the number of device sectors and the number of antenna sectors to activate one of the antenna sectors. The activated antenna sector may be used to transmit beamformed data to the target device. In this manner, the example embodiments may allow the user to facilitate the transmission of beamformed data in the direction of the target device irrespective of the orientation of the wireless device relative to the target device and/or irrespective of the orientation of the wireless device relative to the wireless device's antenna elements. The data transmitted from the wireless device to the target device may be any suitable data or item including, for example, objects, data, images, audio, video, links, text, copies of files, and the like.

The example embodiments are described below in the context of wireless local area networks (WLANs) for simplicity only. It is to be understood that the example embodiments are equally applicable to other wireless networks (e.g., cellular networks, pico networks, femto networks, satellite networks, etc.), as well as for systems using signals of one or more wired standards or protocols (e.g., Ethernet and/or HomePlug/PLC standards). As used herein, the terms "wireless local area network," "WLAN," and "Wi-Fi" may include communications governed by the IEEE 802.11 family of standards, BLUETOOTH® ("Bluetooth"), communications governed by the 802.15.4 family of standards (e.g., ZigBee, Thread, Z-Wave, etc.), HiperLAN (a set of wireless standards, comparable to the IEEE 802.11 standards, used primarily in Europe), and other technologies having relative short radio propagation range. Thus, the terms "WLAN" and "Wi-Fi" may be used interchangeably herein.

In addition, although described below in terms of an infrastructure WLAN system including one or more APs and a number of STAs, the example embodiments are equally applicable to other WLAN systems including, for example, multiple WLANs, peer-to-peer systems (e.g., operating according to Wi-Fi Direct protocols), Independent Basic Service Set (IBSS) systems, Wi-Fi Direct systems, and/or Hotspots. Further, although described herein in terms of exchanging data frames between wireless devices, the example embodiments may be applied to the exchange of any data unit, packet, and/or frame between wireless devices. Thus, the term "packet" may include any frame, packet, or data unit such as, for example, protocol data units (PDUs), MAC service data units (MPDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable data storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other suitable configuration.

FIG. 1 is a block diagram of a wireless system 100 within which the example embodiments may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 may be assigned a unique media access control (MAC) address that is programmed therein by, for example, the manufacturer of the access point. Similarly, each of stations STA1-STA4 may also be assigned a unique MAC address. For some embodiments, the wireless system 100 may correspond to a multiple-input multiple-output (MIMO) wireless network, and may support single-user MIMO (SU-MIMO) and multi-user (MU-MIMO) communications. Further, although the WLAN 120 is depicted in FIG. 1 as an infrastructure BSS, for other example embodiments, WLAN 120 may be an IBSS, an ad-hoc network, or a peer-to-peer (P2P) network (e.g., operating according to the Wi-Fi Direct protocols).

Each of stations STA1-STA4 may be any suitable Wi-Fi enabled wireless device including, for example, a cell phone, personal digital assistant (PDA), tablet device, laptop computer, or the like. Each of stations STA1-STA4 may also be referred to as a user equipment (UE), a subscriber station, a mobile unit, a subscriber unit, a wireless unit, a remote unit, a wireless device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each of stations STA1-STA4 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 8-9.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 8-9.

For the stations STA1-STA4 and/or AP 110, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band, within a 5 GHz frequency band in accordance with the IEEE 802.11 specification, and/or within a 60 GHz frequency band accordance with the IEEE 802.11ad standards. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within each of the stations STA1-STA4 may be any technically feasible transceiver such as a ZigBee transceiver described by a specification from the ZigBee specification, a WiGig transceiver, and/or a HomePlug transceiver described a specification from the HomePlug Alliance.

For at least some embodiments, each of the stations STA1-STA4 and AP 110 may include radio frequency (RF) ranging circuitry (e.g., formed using well-known software modules, hardware components, and/or a suitable combination thereof) that may be used to estimate the distance between itself and another Wi-Fi enabled device and to determine the position of itself, relative to one or more other wireless devices, using ranging techniques as are known in the art. In addition, each of the stations STA1-STA4 and/or AP 110 may include a local memory (not shown in FIG. 1 for simplicity) to store a cache of Wi-Fi access point and/or station data.

Figure 2:
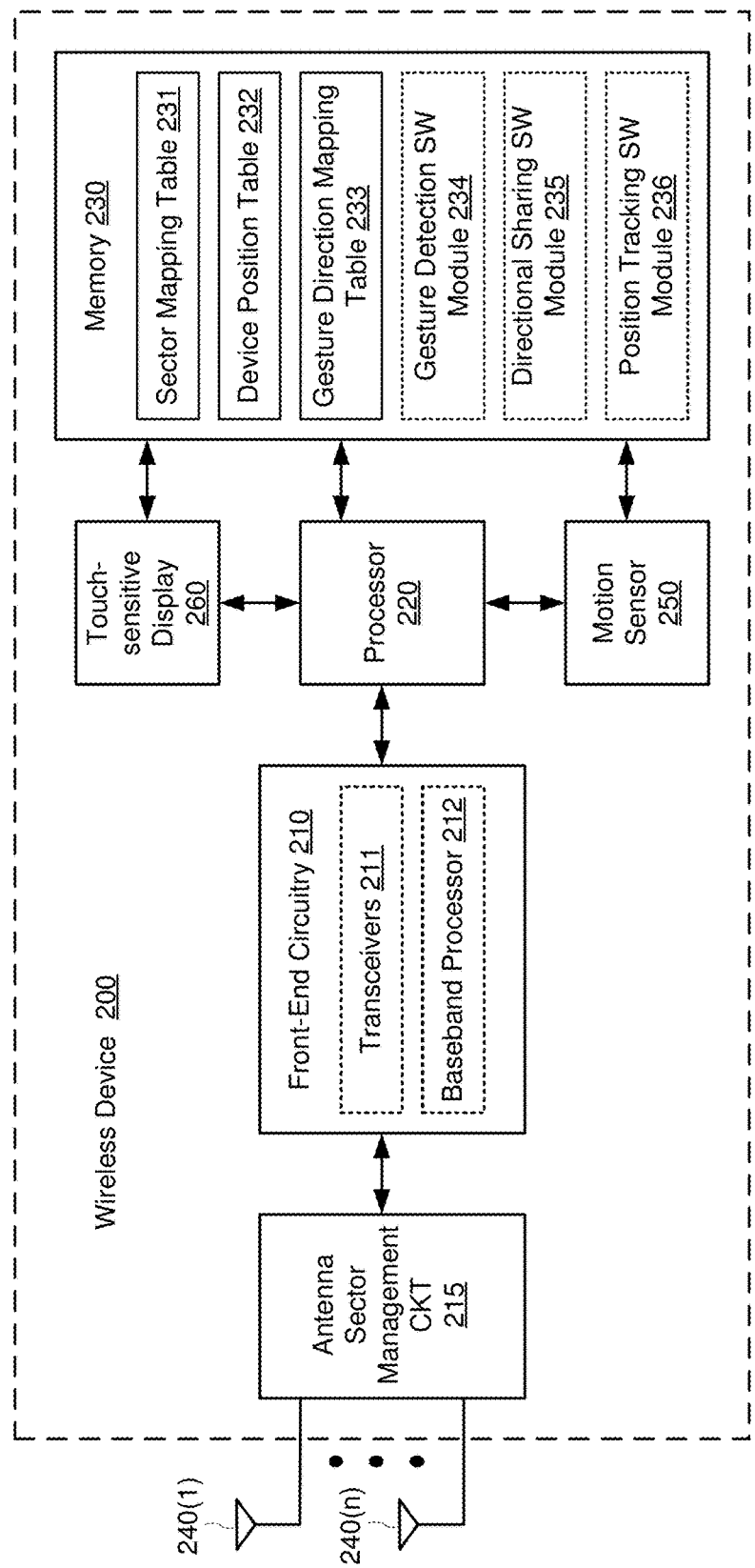
FIG. 2 is a block diagram of a wireless device in accordance with example embodiments.

FIG. 2 is a block diagram of a wireless device 200 in accordance with example embodiments. The wireless device 200 may be an embodiment of at least one of the stations STA1-STA4. As shown in FIG. 2, the wireless device 200 may include front-end circuitry 210, an antenna sector management circuit 215, a processor 220, a memory 230, a number of antenna elements 240(1)-240(n), a motion sensor 250, and a touch-sensitive display 260. For purposes of discussion herein, processor 220 is shown in FIG. 2 as being coupled between the front-end circuitry 210 and memory 230. For actual embodiments, the front-end circuitry 210, processor 220, memory 230, motion sensor 250, and/or touch-sensitive display 260 may be connected together using one or more buses (not shown for simplicity). Furthermore, the wireless device 200 may include a memory controller (not shown for simplicity) that interfaces the memory 230 with the processor 220 and/or front-end circuitry 210.

The front-end circuitry 210 may include one or more transceivers 211 and a baseband processor 212. For the example of FIG. 2, the transceivers 211 may be coupled to the antenna elements 240(1)-240(n) via antenna sector management circuit 215. For other implementations, the transceivers 211 may be coupled directly to the antenna elements 240(1)-240(n). The transceivers 211 may be used to communicate wirelessly with one or more other wireless devices (e.g., STAs, APs, and/or other suitable wireless devices) via the antenna elements 240(1)-240(n).

The baseband processor 212 may be used to process signals received from processor 220 and/or memory 230 and to forward the processed signals to transceivers 211 for transmission via one or more of the antenna elements 240(1)-240(n). The baseband processor 212 may also be used to process signals received from one or more of the antenna elements 240(1)-240(n) via transceivers 211 and to forward the processed signals to processor 220 and/or memory 230.

The antenna elements 240(1)-240(n) may form a multi-dimensional antenna array constructed as an N-phase array antenna, where N is an integer greater than or equal to 2 (antenna array not shown for simplicity). For at least some implementations, the antenna elements 240(1)-240(n) may form a 32-phase array antenna. The antenna elements 240(1)-240(n) may be configured to beamform data transmissions in a selected transmit direction by activating one of a number of antenna sectors associated with the antenna array. Each of the transmit directions may correspond to one of a number of device sectors relative to the physical dimensions of the wireless device 200, for example, as described in more detail below with respect to FIG. 3A.

Each of the antenna sectors may correspond to a unique set of phase shift values and gain values applied to the antenna elements 240(1)-240(n). More specifically, various combinations of phase shift values and gain values may be used to "activate" one of the antenna sectors so that data transmissions from wireless device 200 may be beamformed in a selected direction. In some aspects, the wireless device 200 may transmit beamformed data in a manner compliant with the IEEE 802.11n, the IEEE 802.11ac, the IEEE 802.11ad, and/or the IEEE 802.11ax standards. In other aspects, wireless device 200 may transmit beamformed data in a manner compliant with other suitable wireless communication protocols including, for example, near-field communication (NFC) signals, infrared (IF) signals, WiGig signals, Bluetooth signals, and/or any other technically feasible wireless signals.

The antenna sector management circuit 215 may apply the phase shift values and gain values to the antenna elements 240(1)-240(n) to activate one of the antenna sectors based on a desired direction in which data transmissions are to be beamformed. In addition, the antenna sector management circuit 215 may selectively couple individual transmit and/or receive chains within transceivers 211 to different antenna elements 240(1)-240(n). More specifically, when wireless device 200 transmits data to one or more other devices, the same data stream may be provided to each of the antenna elements 240(1)-240(n), and different phase shift values and gain values may be applied to each of the antenna elements 240(1)-240(n). The resulting set of phase shift values and gain values may cause wireless signals transmitted from the antenna elements 240(1)-240(n) to constructively interfere with each other in a selected transmit direction while destructively interfering with each other (e.g., creating nulls) in other directions. In this manner, data transmissions from wireless device 200 may be beamformed in the selected transmit direction, for example, to facilitate reception of the data transmissions by one or more target devices located in the selected transmit direction (e.g., relative to an orientation of wireless device 200).

As mentioned above, each set of phase shift values and gain values to be applied to the antenna elements 240(1)-240(n) may correspond to an antenna sector, and each of the antenna sectors may be associated with a corresponding beamforming direction. The antenna sectors and each of their corresponding phase shift and gain values may be stored within any suitable memory (e.g., memory 230) of wireless device 200. For some implementations, the antenna sectors may be hard coded into wireless device 200 using hexadecimal format. For other implementations, the antenna sectors may be hard coded using any other suitable coding technique.

Figures 5A, 5B:
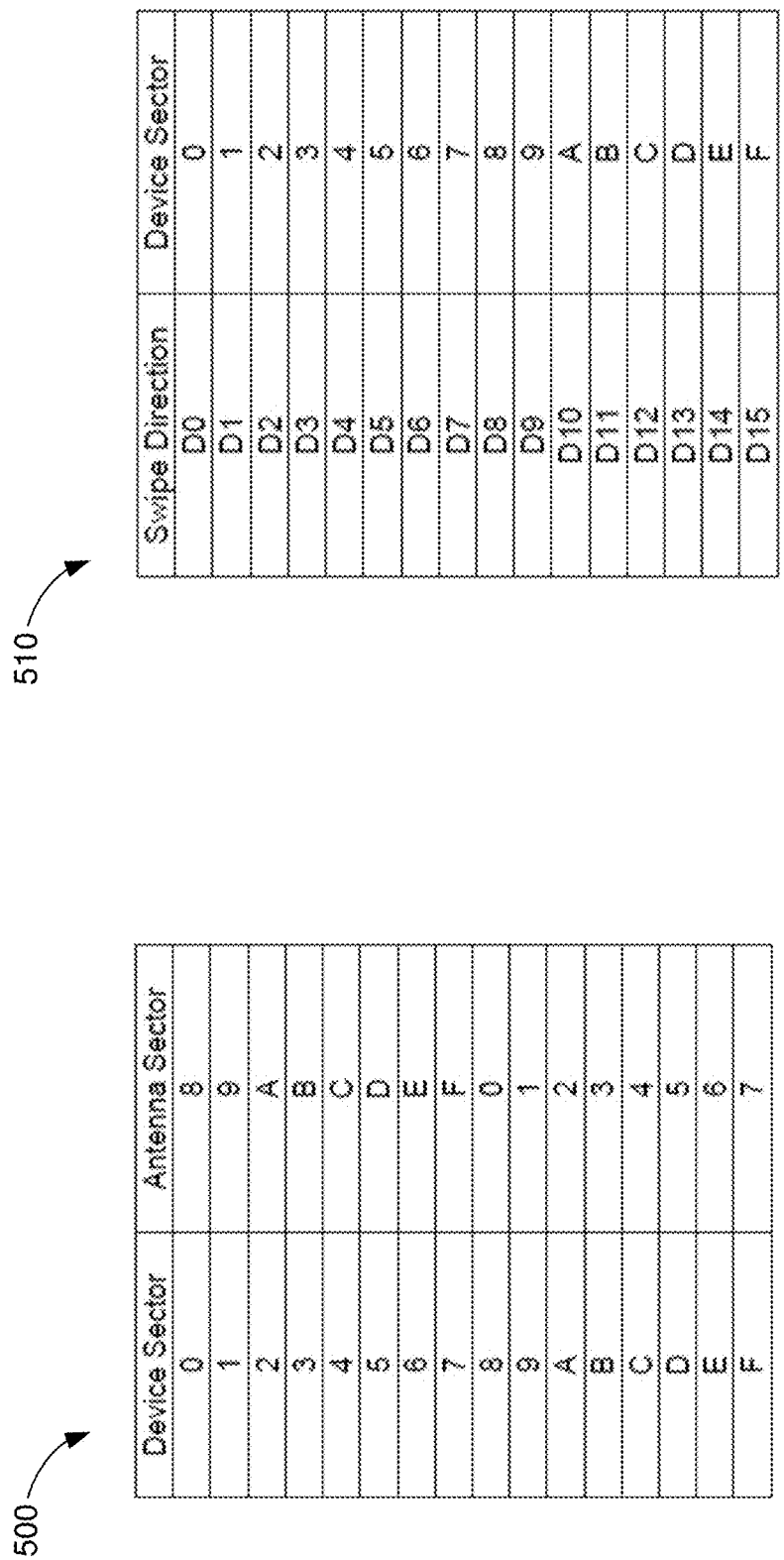
FIG. 5A shows a table depicting an example mapping between device sectors and antenna sectors of the wireless device of FIG. 2, in accordance with example embodiments.
FIG. 5B shows a table depicting an example mapping between swipe gesture directions and device sectors of the wireless device of FIG. 2, in accordance with example embodiments.

Memory 230 may include a sector mapping table 231 that stores a mapping between device sectors and antenna sectors of wireless device 200, for example, as described in more detail below with respect to FIG. 5A. Memory 230 may also include a device position table 232 that stores a mapping between device sectors of wireless device 200 and positions of one or more other wireless devices (e.g., one or more target devices with which wireless device 200 may wirelessly share data). In some aspects, the device position table 232 may be used to identify the one or more target devices using remote device identifications (IDs) assigned to the target devices. In other aspects, the device position table 232 may be used to identify the one or more target devices using other suitable identifiers including, for example, media access control (MAC) addresses.

Memory 230 may include a gesture direction mapping table 233 that stores a mapping between a plurality of swipe gesture directions and the number of device sectors of wireless device 200, for example, as described in more detail below with respect to FIG. 5B. In some aspects, the gesture direction mapping table 233 may store a mapping between the plurality of swipe gesture directions, the number of device sectors, and the number of antenna sectors of wireless device 200, for example, as described in more detail below with respect to FIG. 5C.

Memory 230 may also include a non-transitory computer-readable medium (not shown) (e.g., one or more nonvolatile memory elements, such as EPROM, EEPROM, Flash memory, a hard drive, and so on) that may store the following software (SW) modules:

- a gesture detection SW module 234 to detect a swipe gesture on the touch-sensitive display 260 and/or to determine a direction of the detected swipe gesture, for example, as described below for one or more operations of FIGS. 8-9;
- a directional sharing SW module 235 to active one of the antenna sectors based on the mapping between swipe gesture directions and the antenna sectors of wireless device 200, for example, as described below for one or more operations of FIGS. 8-9; and
- a position tracking SW module 236 to determine and track the position and/or orientation of wireless device 200 based, at least in part, on information received from motion sensor 250 and/or to determine and track the position of one or more target devices, for example, as described below for one or more operations of FIGS. 8-9.

Each software module includes instructions that, when executed by processor 220, cause the wireless device 200 to perform the corresponding functions. The non-transitory computer-readable medium of memory 230 thus includes instructions for performing all or a portion of the operations described below with respect to FIGS. 8-9.

Processor 220 may be any suitable one or more processors capable of executing scripts or instructions of one or more software programs stored in wireless device 200 (e.g., within memory 230). For example, processor 220 may execute the gesture detection SW module 234 to detect a swipe gesture on the touch-sensitive display 260 and/or to determine a direction of the detected swipe gesture. Processor 220 may execute the directional sharing SW module 235 to activate one of the antenna sectors based on the mapping between swipe gesture directions and the antenna sectors of wireless device 200. Processor 220 may execute the position tracking SW module 236 to determine and track the position and/or orientation of wireless device 200 based, at least in part, on information received from motion sensor 250. In some aspects, processor 220 may execute the position tracking SW module 236 to determine and track the position of one or more target devices.

The touch-sensitive display 260 may provide visual information to the user. For example, touch-sensitive display 260 may present or display text, images, video, graphics, and/or other information rendered from one or more applications executed by wireless device 200 and/or received from another device (e.g., information received from one or more target devices). The touch-sensitive display 260 may also present or display information regarding incoming or outgoing calls, text messages, emails, media, games, phone books, address books, the current time, and other suitable information well-known in the field of mobile communication devices.

The touch-sensitive display 260 may be any suitable display, panel, screen, or area capable of detecting a position and direction of a user contact, input, and/or gesture. For example, the touch-sensitive display 260 may be a liquid crystal display (LCD), a thin film transistor (TFT) LCD, an in-place switching (IPS) LCD, a resistive touchscreen LCD, a capacitive touchscreen LCD, an organic light emitting diode (OLED) display, an active matrix organic light emitting diode (AMOLED) display, and/or any other suitable display. The user contact may include any contact made by a user on the touch-sensitive display 260 including, for example, contacts made by the user's body (e.g., the user's fingers or thumbs) and/or contacts made by a pen, stylus, and the like. The user gestures may include, for example, dragging gestures, swiping gestures, flicking gestures, and/or any suitable gesture from which a direction may be determined by the wireless device 200. Thus, although the example embodiments are described below with respect to a swipe gesture, it is to be understood that wireless devices in accordance with the example embodiments may facilitate the transmission of data to one or more target devices based on any suitable user gesture, contact, and/or other user input.

In accordance with the example embodiments, a user of wireless device 200 may share data with one or more target devices based on a swipe gesture provided on the touch-sensitive display 260. More specifically, when a swipe gesture is detected on the touch-sensitive display 260, the wireless device 200 may determine whether a direction of the swipe gesture corresponds to a position or location of at least one target device. If the direction of the swipe gesture does not correspond to the position of at least one target device, then the wireless device 200 may either ignore the swipe gesture or prompt the user to select the target device with which the user intends to share data. In some aspects, the wireless device 200 may present, on the touch-sensitive display 260, a menu of nearby target devices with which the data may be shared, and then transmit data to the target device(s) based on a user selection of the target device(s) from the menu (menu not shown for simplicity).

Conversely, if the direction of the swipe gesture corresponds to the position of a target device, then the wireless device 200 may wirelessly transmit the data to the target device using the antenna elements 240(1)-240(n). More specifically, for some implementations, the wireless device 200 may use well-known beamforming techniques to transmit the data as a beam directed to the target device. The beam, which may be formed by or otherwise associated with any suitable number of spatial streams, may be formed in a transmit direction corresponding to the direction of the swipe gesture detected on the touch-sensitive display 260.

An application layer (not shown for simplicity) of wireless device 200 may be used to facilitate the transmission of beamformed data to a target device in response to a swipe gesture detected on the touch-sensitive display 260. However, the application layer of wireless device 200 may not be aware of relationships between the direction of the swipe gesture, the spatial orientation of the wireless device 200, the direction of the target device relative to the wireless device 200, and/or the orientation of the wireless device's antenna elements 240(1)-240(n). To ensure that the transmit direction of beamformed data transmissions from wireless device 200 corresponds to the direction of the swipe gesture (e.g., so that the beamformed data transmissions are directed towards the intended target device), the wireless device 200 may determine which of the number of antenna sectors associated with antenna elements 240(1)-240(n) corresponds to the direction of the swipe gesture detected on the touch-sensitive display 260. In some aspects, the wireless device 200 may use a mapping between swipe gesture directions and device sectors to identify which of the device sectors corresponds to the direction of the swipe gesture, and then use a mapping between device sectors and antenna sectors to identify which of the antenna sectors corresponds to the direction of the swipe gesture. In other aspects, the wireless device 200 may use a mapping between swipe gesture directions and antenna sectors to identify which of the antenna sectors corresponds to the direction of the swipe gesture. The wireless device 200 may activate the identified antenna sector and then use the activated antenna sector to transmit beamformed data to the target device positioned in the direction of the detected swipe gesture. In this manner, the example embodiments may allow the user to facilitate the transmission of beamformed data in the direction of the target device, irrespective of the orientation of the wireless device 200 relative to the target device and/or irrespective of the orientation of the wireless device 200 relative to its antenna elements 240(1)-240(n).

Figure 3B:
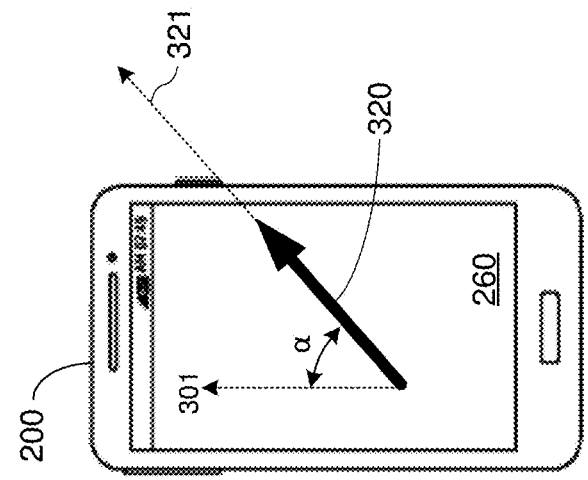
FIG. 3B depicts a user gesture on a touch-sensitive display of the wireless device of FIG. 2, in accordance with example embodiments.
Figure 3A:
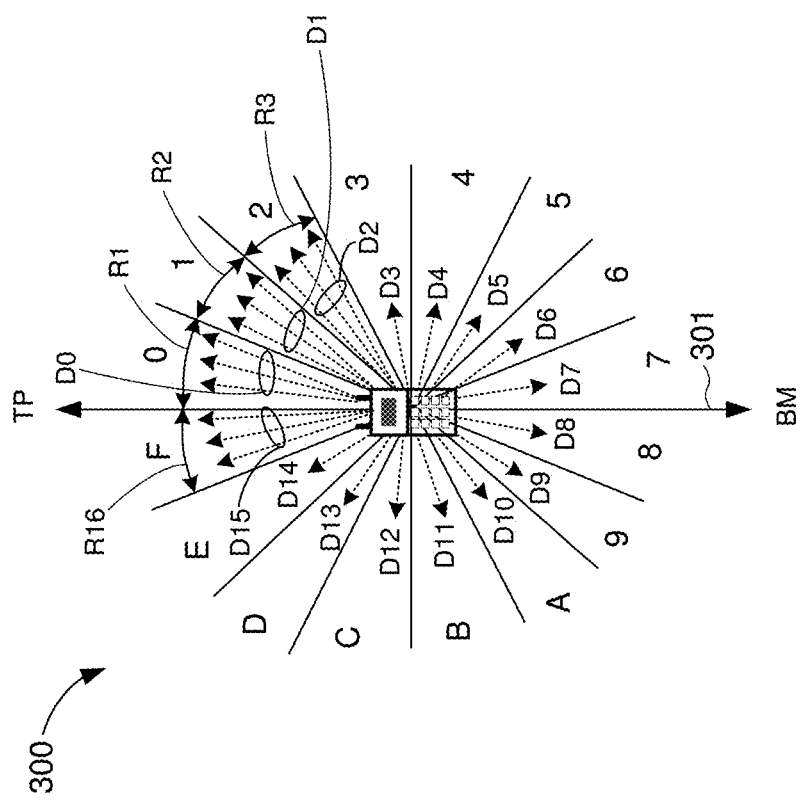
FIG. 3A depicts a plurality of beamform transmit directions relative to a number of device sectors of the wireless device of FIG. 2, in accordance with example embodiments.

FIG. 3A shows an example device sector map 300 depicting a plurality of beamform transmit directions relative to a number of device sectors of the wireless device of FIG. 2. For the example of FIG. 3A, the 2-dimensional plane parallel with a front face of wireless device 200 is divided into 16 device sectors denoted by hexadecimal numbers 0-F (although for other implementations, the 2-dimensional plane may be divided into a different number of device sectors). Each of the device sectors 0-F corresponds to a 22.5-degree portion of the 360-degree plane surrounding wireless device 200, and may include or represent a corresponding set of transmit directions of beamformed data transmissions from the wireless device 200. The device sectors 0-F may be assigned in a clock-wise manner relative to an axis 301 between a top (TP) and bottom (BM) of wireless device 200. For example, as depicted in FIG. 3A, device sector 0 corresponds to a first range R1 of angles between 0 degrees and 22.5 degrees relative to axis 301 and may include a first set (D0) of transmit directions, device sector 1 corresponds to a second range R2 of angles between 22.5 degrees and 45 degrees relative to axis 301 and may include a second set (D1) of transmit directions, device sector 2 corresponds to a third range R3 of angles between 45 degrees and 67.5 degrees relative to axis 301 and may include a third set (D2) of transmit directions, and so on, where device sector F corresponds to a sixteenth range R16 of angles between 337.5 degrees and 360 degrees relative to axis 301 and may include a sixteenth set (D15) of transmit directions.

In accordance with the example embodiments, the direction of a swipe gesture on the touch-sensitive display 260 may be mapped or described relative to a corresponding one of the device sectors 0-F of device sector map 300, for example, as described below with respect to FIG. 5B. In a similar manner, the direction of a swipe gesture on the touch-sensitive display 260 may be mapped to a corresponding antenna sector of wireless device 200, for example, as described below with respect to FIG. 5C. Thus, in some aspects, the direction of a swipe gesture on the touch-sensitive display 260 and the transmit direction of an associated beamformed data transmission may be described in terms of device sectors and antenna sectors of wireless device 200, as described in more detail below.

FIG. 3B depicts the wireless device 200 detecting a swipe gesture 320 on the touch-sensitive display 260. The swipe gesture 320 has a direction 321 at an angle (α) relative to axis 301. For the example of FIG. 3B, the value of α=60 degrees relative to axis 301, and therefore the swipe gesture 320 may indicate a transmit direction of approximately 60 degrees relative to axis 301. Referring also to FIG. 3A, the transmit direction indicated by swipe gesture 320 falls within the third range R3 of angles represented by device sector 2, and therefore corresponds to the third set D2 of transmit directions. Referring also to FIG. 2, in some aspects, processor 220 may execute the gesture detection SW module 234 to detect the swipe gesture 320 and determine that the direction 321 of the swipe gesture 320 corresponds to device sector 2 and to third set D2 of transmit directions.

The wireless device 200 may determine whether a target device (not shown in FIG. 3B for simplicity) is located within the device sector corresponding to the determined direction 321 of the swipe gesture 320. The wireless device 200 may use any suitable techniques to determine the current position of the target device. In some aspects, the wireless device 200 may already have established a wireless connection with the target device, and may use information associated with the established wireless connection to determine the current position of the target device (e.g., using wireless ranging techniques, channel sounding techniques, compressed beamforming reports from the target device, and so on). In other aspects, the wireless device 200 may store the position of the target device in a suitable memory (e.g., within the device position table 232 of memory 230).

The wireless device 200 may determine whether the direction 321 of the swipe gesture 320 corresponds to the current position of the target device. In some aspects, processor 220 may execute the directional sharing SW module 235 to determine whether the target device is located within the range of angles represented by the device sector corresponding to the direction 321 of the swipe gesture 320. If the target device is not located within the device sector corresponding to the direction 321 of the swipe gesture 320, then the wireless device 200 may present a menu or list of target devices on the touch-sensitive display 260. The user may select one or more of the listed target devices with which to direct data transmissions, and the wireless device 200 may transmit data to the target device(s) selected by the user.

Conversely, if the target device is located within the device sector corresponding to the direction 321 of the swipe gesture 320, then the wireless device 200 may select one of its antenna sectors to activate for transmitting beamformed data to the target device (e.g., in the direction indicated by the swipe gesture 320). As discussed above, an antenna sector may refer to a set of phase shift values and gain values that, when applied to the antenna elements 240(1)-240(n), may form a beam in a corresponding transmit direction. In accordance with the example embodiments, the wireless device 200 may select one of the antenna sectors for activation based on a mapping between a plurality of swipe gesture directions and the number of antenna sectors.

Figure 4:
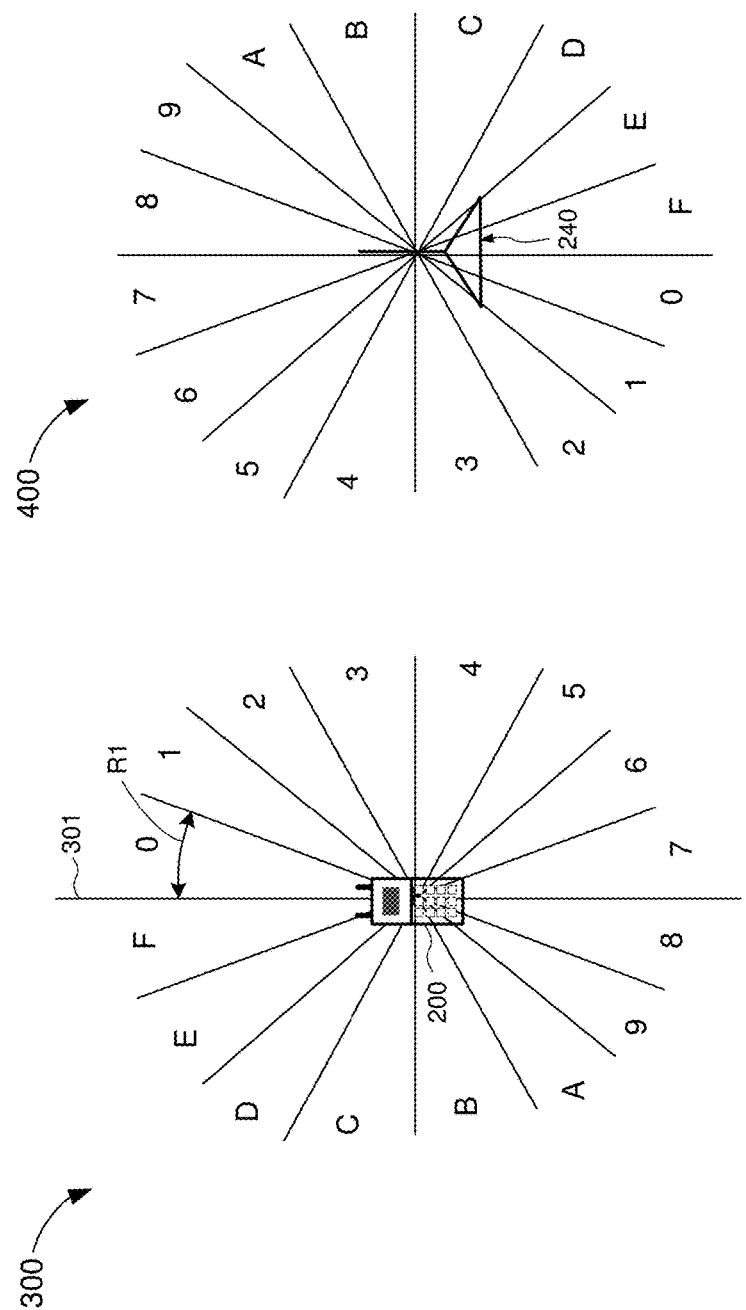
FIG. 4 illustrates an example mismatch between device sectors and antenna sectors of the wireless device of FIG. 2, in accordance with example embodiments.

As mentioned above, because the position and/or orientation of the antenna sectors of wireless device 200 relative to the device sectors depicted in FIG. 3A may not be known by application layer programs that execute data sharing programs, there may be mismatch between the antenna sectors and the device sectors of wireless device 200. FIG. 4 illustrates an example mismatch between the device sector map 300 of wireless device 200 and an antenna sector map 400 of wireless device 200. As depicted in the example of FIG. 4, device sector 0 (which represents the range of transmit angles between 0 degrees and 22.5 degrees relative to axis 301) is not aligned with antenna sector 0 (which may correspond to a front-facing portion of the antenna array). The mismatch between the device sector map 300 and the antenna sector map 400 may be used to create the mapping between device sectors and antenna sectors of wireless device 200.

For some implementations, the mapping between device sectors and antenna sectors may be created by positioning a reference device (e.g., a calibration device) within device sector 0 of the wireless device 200, and then exchanging a number of signals with the reference device using various combinations of beamforming settings (e.g., by activating different ones of the antenna sectors). Thereafter, the wireless device 200 may determine a relationship between its device sectors and its antenna sectors based on the exchanged signals. More specifically, the wireless device 200 may engage in a beam refinement protocol (BRP) with the reference device. The wireless device 200 may use antenna elements 240(1)-240(n) to continuously scan for an optimal antenna sector with which to exchange data with the reference device by sweeping multiple antenna sectors. In some aspects, the wireless device 200 may sweep one or more antenna sectors by appending transmit and receive training fields (TRNT/R) to the frames exchanged during BRP transactions. The reference device may transmit BRP feedback in the form of signal-to-noise ratio (SNR) values or received signal strength indicator (RSSI) values. The antenna sector having the highest SNR and/or RSSI value may be selected, and that antenna sector may be assigned to device sector "0." Based on the antenna sector mapped to device sector "0," the remaining antenna sectors may be mapped to the remaining device sectors in a clockwise direction. For purposes of discussion herein, the exchange of signals between wireless device 200 and the reference device (not shown for simplicity) results in device sector 0 being mapped to antenna sector 8. Thereafter, the other antenna sectors may be mapped to the other device sectors sequentially in a clock-wise manner, for example, as depicted in the example sector mapping table 500 of FIG. 5A (which may be one implementation of the sector mapping table 231 of FIG. 2). In some aspects, the sector mapping table 500 may be determined during manufacture of wireless device 200. In other aspects, the sector mapping table 500 may be determined and/or updated during use of wireless device 200.

The wireless device 200 may use a relationship between device sectors and transmit directions associated with swipe gesture directions (e.g., as depicted in FIG. 3A) to create a mapping between swipe gesture directions and the device sectors of wireless device 200. For example, FIG. 5B shows a table 510 depicting an example mapping between a plurality of swipe gesture directions D0-D15 and the device sectors 0-F of wireless device 200, where each of the swipe gesture directions corresponds to a respective one of the sets of transmit directions D0-D15 depicted in FIG. 3A. In some aspects, the wireless device 200 may use the sector mapping table 500 of FIG. 5A and the table 510 of FIG. 5B to create a mapping between swipe gesture directions and the antenna sectors of wireless device 200.

Figure 5D:
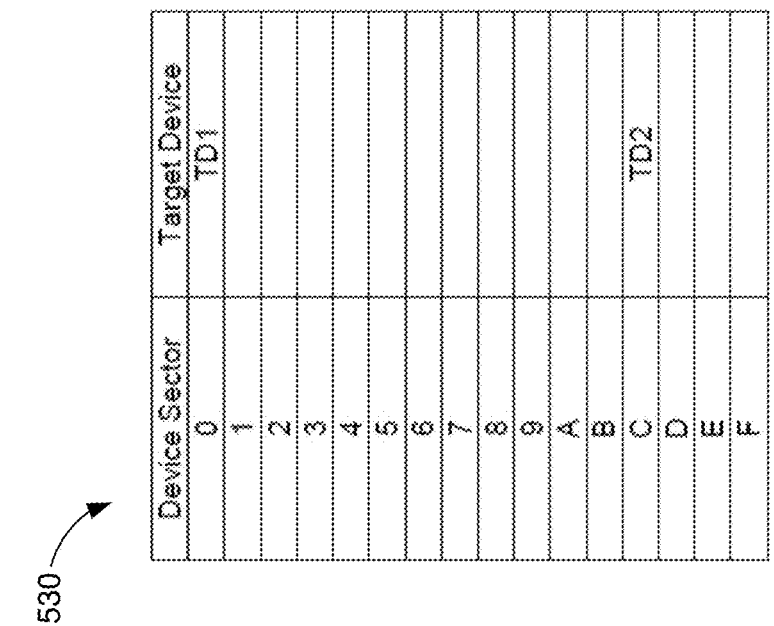
FIG. 5D shows an example device position table, in accordance with example embodiments.
Figure 5C:
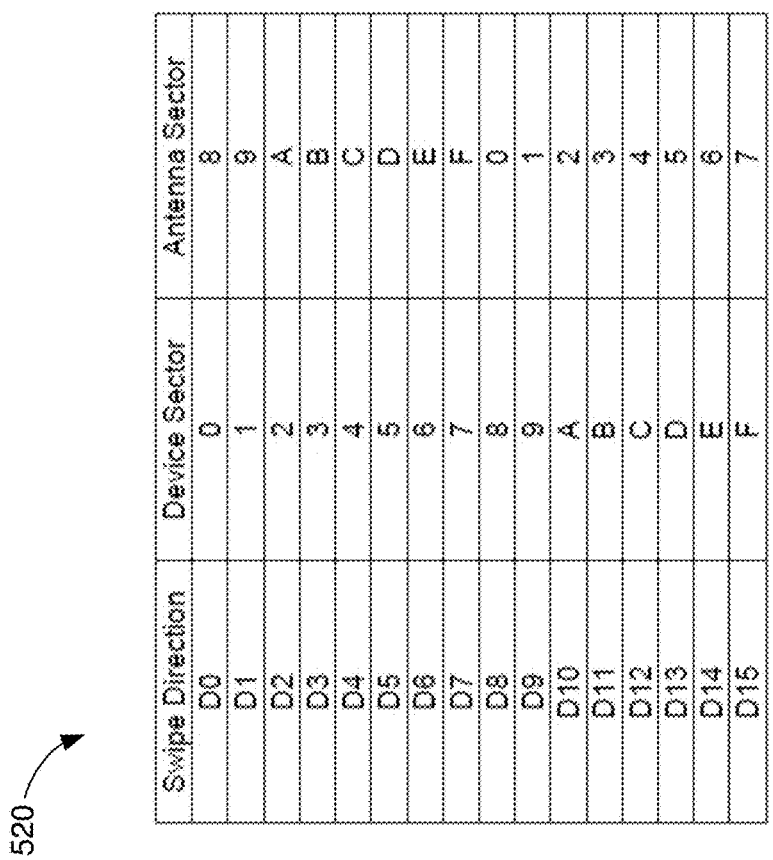
FIG. 5C shows a table depicting an example mapping between swipe gesture directions, device sectors, and antenna sectors of the wireless device of FIG. 2, in accordance with example embodiments.

For example, FIG. 5C shows a table 520 depicting an example mapping between the plurality of swipe gesture directions D0-D15, the device sectors of wireless device 200, and the antenna sectors of wireless device 200. For some implementations, the wireless device 200 may use the mapping between swipe gesture directions and antenna sectors depicted in the example table 520 of FIG. 5C to determine which of its antenna sectors to activate in response to the direction of a swipe gesture detected on the touch-sensitive display 260. The mapping between swipe gesture directions and antenna sectors depicted in the example table 520 may be stored in the gesture direction mapping table 233 of FIG. 2.

The wireless device 200 may also map the positions of one or more target devices to the device sector map 300 of wireless device 200, and store the resulting position mapping in the device position table 232 of FIG. 2. In this manner, the wireless device 200 may retrieve the position of each of the one or more target devices, relative to the device sector map 300, by accessing the device position table 232. For example, FIG. 5D shows an example mapping table 530 indicating that the position of a first target device (TD1) corresponds to device sector 0 of wireless device 200 and the position of a second target device (TD2) corresponds to device sector C of wireless device 200.

For some implementations, the motion sensor 250 may be used to track the position and/or orientation of wireless device 200. The motion sensor 250 may include gyroscopes, accelerometers, magnetometers, a compass, and/or any other suitable device configured for object tracking. In some aspects, the motion sensor 250 may detect translational and/or rotational movement of the wireless device 200. As the wireless device 200 engages in rotational and/or translational movement, the motion sensor 250 may detect the type and distance of the movement, and the position of one or more target devices may be updated in the device position table 232 of FIG. 2 based on corresponding movement information provided by the motion sensor 250.

Figure 6A:
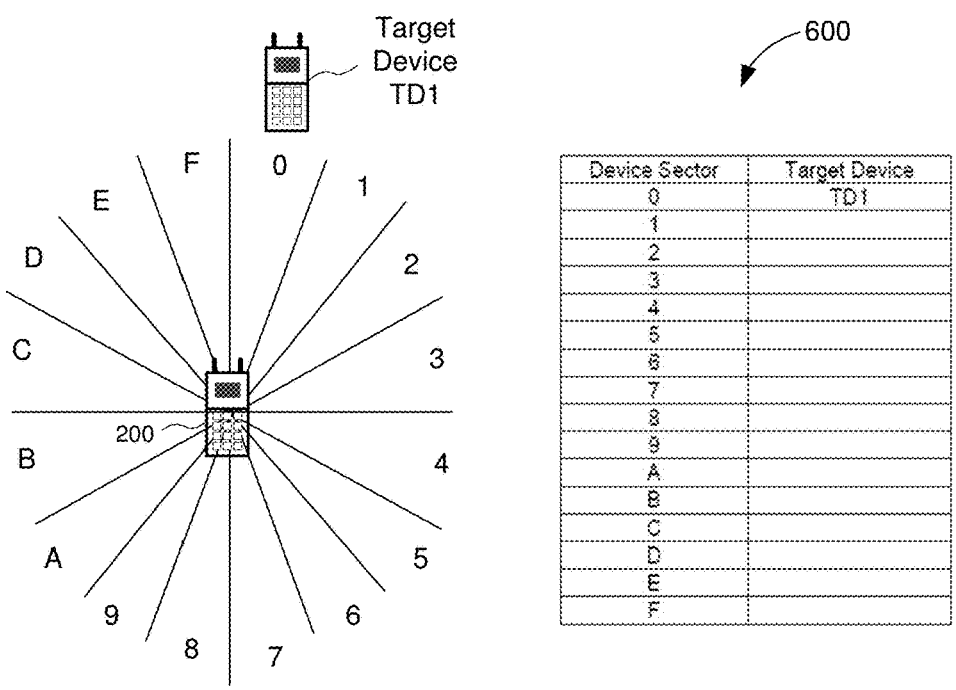
FIG. 6A depicts an example device position table based on an orientation of the wireless device of FIG. 2 at a first time, in accordance with example embodiments.
Figure 6B:
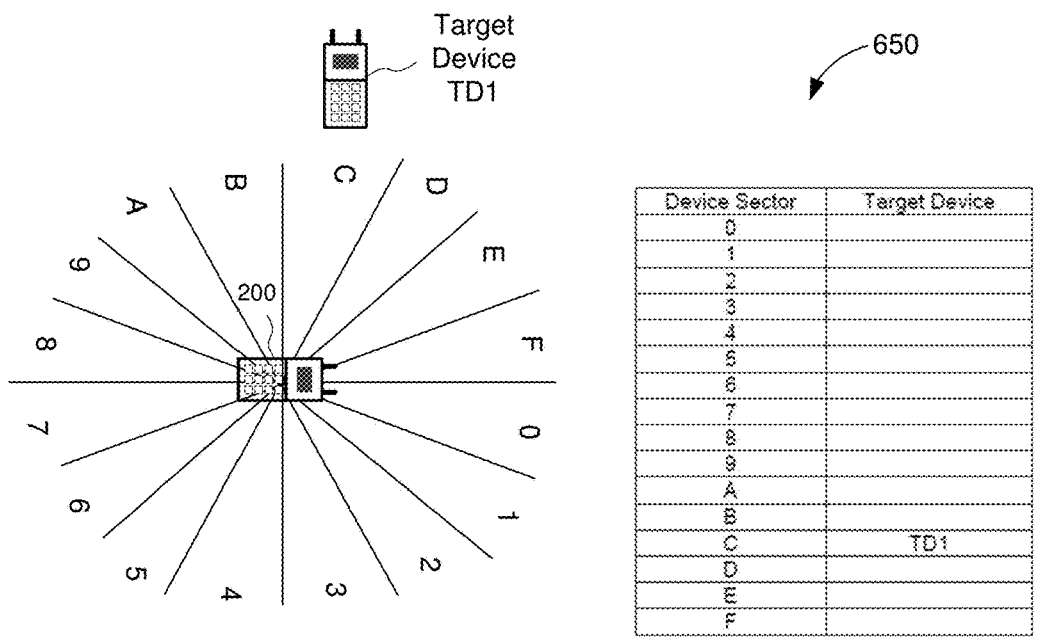
FIG. 6B depicts an example device position table based on an orientation of the wireless device of FIG. 2 at a second time, in accordance with example embodiments.

FIG. 6A depicts an example device position table 600 based on an orientation of wireless device 200 at a first time. The example device position table 600, which may be one embodiment of the device position table 232 of FIG. 2, indicates the position of target device TD1 relative to the device sectors of wireless device 200. For the example of FIG. 6A, target device TD1 is located in device sector 0 of wireless device 200. After the first time, the position and/or orientation of wireless device 200 may change relative to the position and/or orientation of target device TD1. For example, at a second time, a user may rotate wireless device 200 clockwise by 90 degrees (e.g. because the user has turned 90 degrees clockwise to converse with someone), as depicted in FIG. 6B. The motion sensor 250 may detect the rotational movement of wireless device 200, and processor 220 may execute the position tracking SW module 236 to update the device position table 232 based on the rotational movement detected by the motion sensor 250. The updated device position table 650 shown in FIG. 6B depicts the target device TD1 positioned within device sector C of wireless device 200 at the second time (which may be after the first time).

Although not shown in FIG. 6B for simplicity, the wireless device 200 may also continuously track and/or update the position of target device TD1 relative to wireless device 200. For some implementations, wireless device 200 may use the aforementioned beam refinement protocol (BRP) to update the position of the target device TD1 as a function of the device sectors of wireless device 200 (e.g., as a function of device sector map 300 of FIG. 3A).

Figure 7:
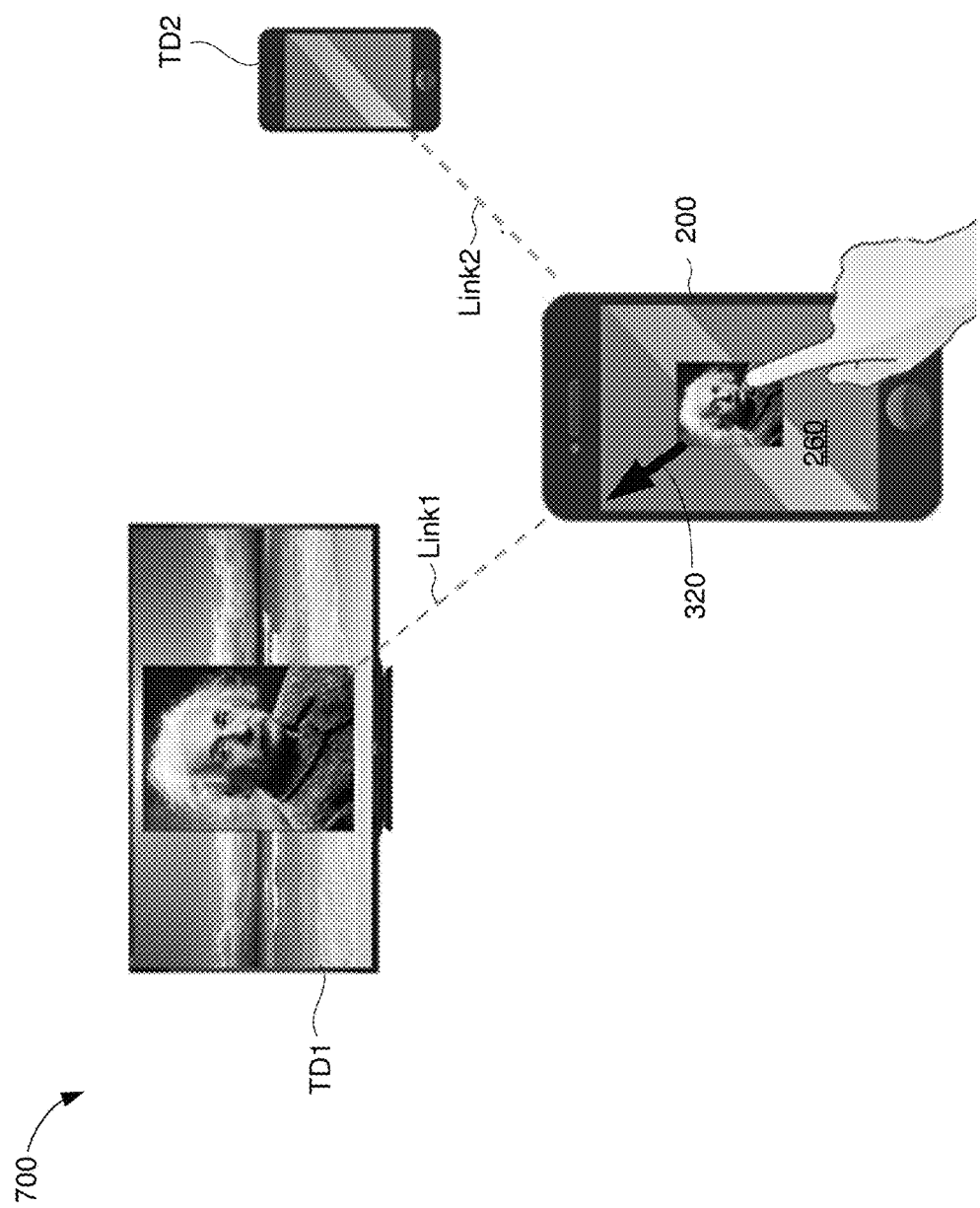
FIG. 7 depicts an example transmission from the wireless device of FIG. 2 to a target device based on a user gesture, in accordance with example embodiments.

FIG. 7 shows a diagram 700 depicting wireless device 200 in the vicinity of a first target device (TD1) and a second target device (TD2). The wireless device 200 may have a first link (Link1) established with the first target device TD1, and may have a second link (Link2) established with the second target device TD2. For the example of FIG. 7, the first target device TD1 is depicted as a smart TV, and the second target device TD2 is depicted as a smartphone. For other implementations, target devices TD1 and TD2 may be any suitable device capable of receiving wireless signals from wireless device 200. For example, target devices TD1 and TD2 may each be a cell phone, a personal digital assistant (PDA), a tablet device, a laptop computer, a smart TV, an Internet of Things (IoT) device (e.g., smart meters, smart light bulbs, cameras, sensors, and the like), speakers, projectors, and so on.

The wireless device 200 may know the positions of target devices TD1 and TD2, for example, using techniques described above, and may have stored the positions of target devices TD1 and TD2 in device position table 232 of FIG. 2. As depicted in FIG. 7, the wireless device 200 may detect a user gesture 320 on touch-sensitive display 260, and may determine that a direction of the gesture 320 corresponds to the current position of target device TD1. The wireless device 200 may use the direction of the gesture 320 to select one of its antenna sectors for activation. In some aspects, the wireless device 200 may use mapping information stored in the gesture direction mapping table 233 determine which of its antenna sectors to activate. In other aspects, the wireless device 200 may determine within which of the device sectors the first target device TD1 is positioned, and then use mapping information stored in the sector mapping table 231 to determine which of its antenna sectors to activate. Thereafter, the wireless device 200 may transmit the data (e.g., a photo of Albert Einstein, depicted in FIG. 7) to the first target device TD1 by using the activated antenna sector to beamform data transmissions in the direction of the first device TD1. Thus, as depicted in FIG. 7, the first target device TD1 receives the data (and may present the photo of Albert Einstein on its display), while the second target device TD2 does not receive the data. In this manner, the wireless device 200 may transmit data to an intended target device without transmitting the data to other (un-intended) target devices.

Figure 8:
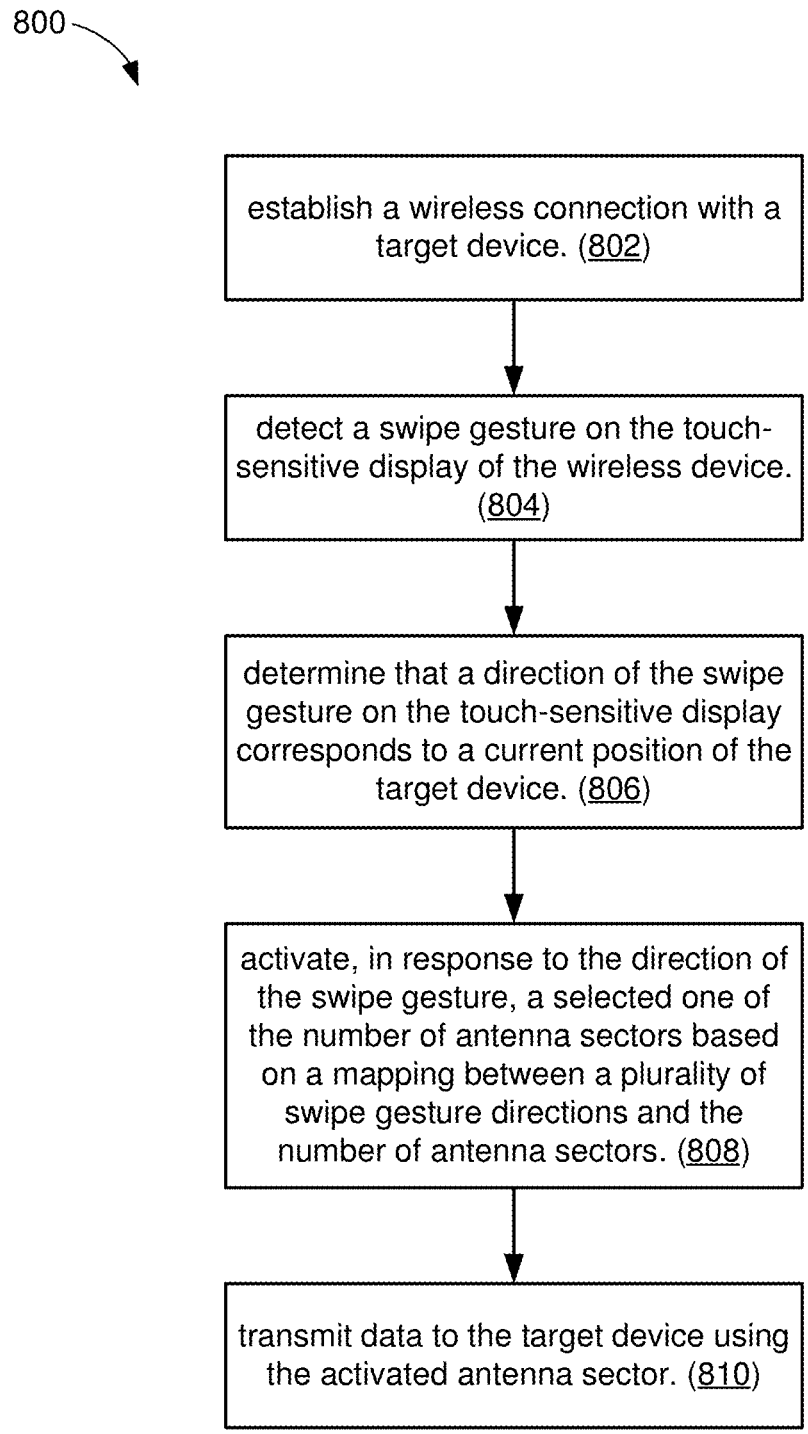
FIG. 8 is an illustrative flow chart depicting an example operation for wirelessly transmitting data from a wireless device to a target device, in accordance with example embodiments.

FIG. 8 is an illustrative flow chart depicting an example operation 800 for transmitting data to a target device, in accordance with the example embodiments. For purposes of discussion herein, the operation 800 may be performed by wireless device 200 of FIG. 2. For other implementations, the example operation 800 may be performed by any other suitable wireless device.

First, the wireless device 200 may establish a wireless connection with a target device (802). As discussed above, the wireless connection may be established using any suitable wireless communication signals including, for example, Wi-Fi signals, NFC signals, WiGig signals, Bluetooth signals, and so on. For some implementations, the established wireless connection may be used to map the position and/or orientation of the target device to a corresponding device sector of the wireless device 200.

The wireless device 200 may detect a swipe gesture on its touch-sensitive display 260 (804), and may determine that a direction of the swipe gesture on the touch-sensitive display corresponds to a current position of the target device (806). For example, referring also to FIG. 2, processor 220 may execute the gesture detection SW module 234 to detect the swipe gesture and/or to determine a direction of the swipe gesture.

The wireless device 200 may activate, in response to the direction of the swipe gesture, a selected one of the number of antenna sectors based on a mapping between a plurality of swipe gesture directions and the number of antenna sectors (808). As discussed above, in some aspects, the wireless device 200 may use mapping information stored in the gesture mapping table 233 of FIG. 2 to select the antenna sector corresponding to the direction of the target device as indicated by the direction of the swipe gesture on the touch-sensitive display 260. In other aspects, the wireless device 200 may determine within which of the device sectors the target device is positioned, and then use mapping information stored in the sector mapping table 231 to determine which of its antenna sectors to activate.

Thereafter, the wireless device 200 may transmit data to the target device using the activated antenna sector (810). As discussed above, the activated antenna sector may be used to beamform data transmissions in the direction of the target device, for example, to maximize the integrity of signals received by the target device while also minimizing the chances of other, un-intended recipients of receiving the data transmissions.

Figure 9:
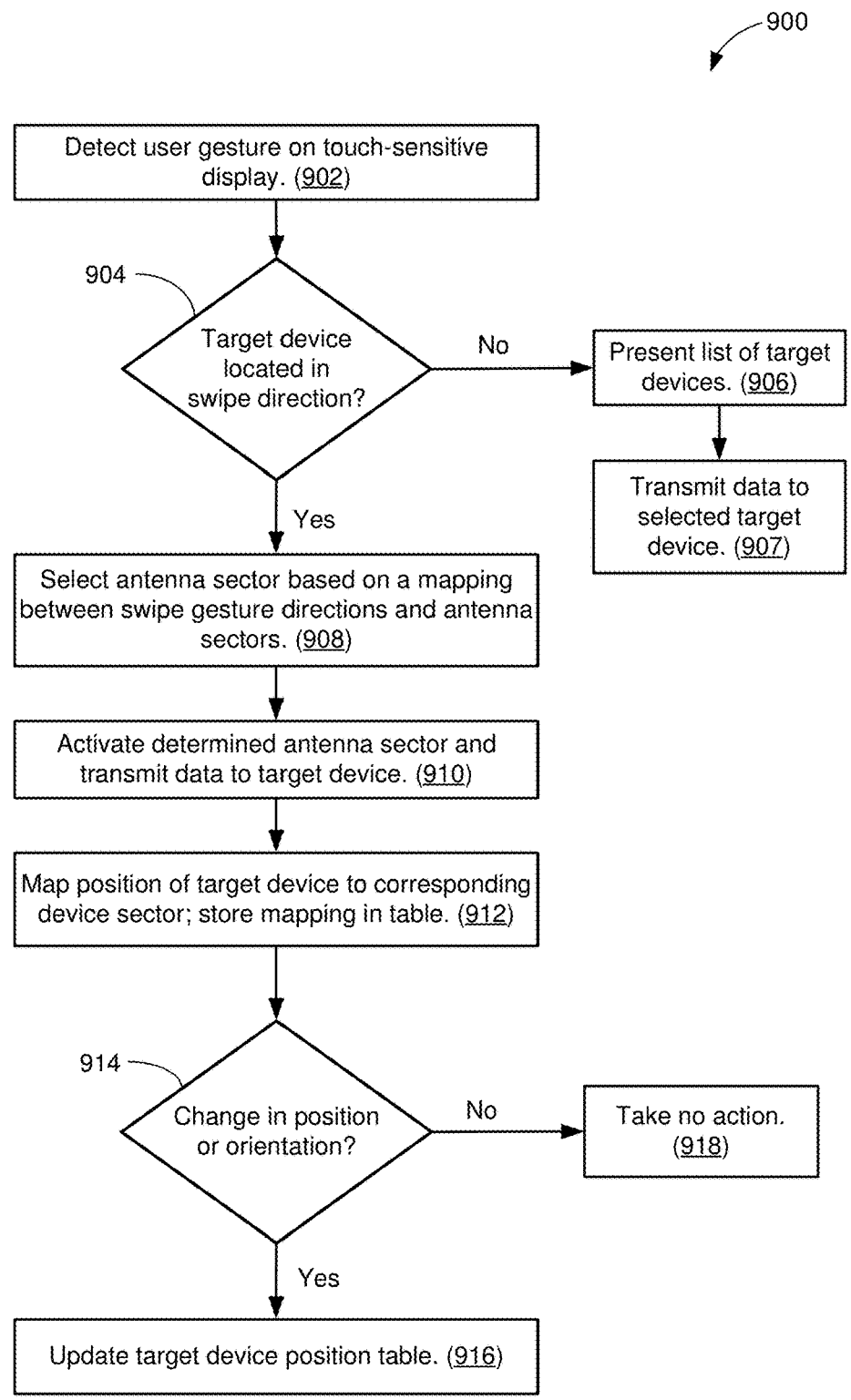
FIG. 9 is an illustrative flow chart depicting another example operation for wirelessly transmitting data from a wireless device to a target device, in accordance with example embodiments.

FIG. 9 is an illustrative flow chart depicting another example operation 900 for transmitting data to a target device, in accordance with the example embodiments. For purposes of discussion herein, the operation 900 may be performed by wireless device 200 of FIG. 2. For other implementations, the example operation 900 may be performed by any other suitable wireless device.

First, the wireless device 200 may detect a swipe gesture on its touch-sensitive display 260 (902), and may determine whether the target device is located in direction of the swipe gesture (904). For some implementations, the wireless device 200 may determine whether the target device is positioned within the device sector associated with the direction of the swipe gesture, for example, based on position information stored in the device position table 232 of FIG. 2.

If the target device is not located in the direction of the swipe gesture, then the wireless device 200 may present a menu or list of target devices on the touch-sensitive display 260 (906). Thereafter, the wireless device 200 may transmit data to the target device selected by the user (907).

Conversely, if the target device is located in the direction of the swipe gesture, then the wireless device 200 may select one of its antenna sectors based on a mapping between a plurality of swipe gesture directions and the number of antenna sectors (908). As discussed above, in some aspects, the wireless device 200 may use mapping information stored in the gesture mapping table 233 of FIG. 2 to select the antenna sector corresponding to the direction of the target device as indicated by the direction of the swipe gesture on the touch-sensitive display 260. In other aspects, the wireless device 200 may determine within which of the device sectors the target device is positioned, and then use mapping information stored in the sector mapping table 231 to determine which of its antenna sectors to activate.

The wireless device 200 may activate the selected antenna sector and transmit data to the target device using the activated antenna sector (910). As discussed above, the activated antenna sector may be used to beamform data transmissions in the direction of the target device.

The wireless device 200 may map the position of the target device to a corresponding device sector, and then store the mapping in the device position table 232 (912). Thereafter, the wireless device 200 may track the position and/or orientation of the target device relative to the position and/or orientation of the wireless device 200 (914). As described above, the motion sensor 250 may detect translational and/or rotational movement of the wireless device 200, and the processor 220 may execute the position tracking SW module 236 to detect changes in position of the target device. If there is a change in the relative position and/or orientation between wireless device 200 and the target device, as tested at 914, then the wireless device 200 may update the position information of target device in the device position table 232, for example, as discussed above with respect to FIGS. 6A-6B (916). Conversely, if there is not a change in the relative position and/or orientation between wireless device 200 and the target device, as tested at 914, then the wireless device 200 may take no action (918).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of wirelessly transmitting data from a wireless device including a number of antenna elements configured to beamform signals in a plurality of transmit directions each associated with a corresponding one of a number of antenna sectors, the method performed by the wireless device and comprising:
   establishing a wireless connection with a target device;
   detecting a swipe gesture on a touch-sensitive display of the wireless device;
   determining that a direction of the swipe gesture on the touch-sensitive display corresponds to a current position of the target device;
   mapping the current position of the target device to the direction of the swipe gesture;
   storing the mapping in a position table in the wireless device;
   generating a mapping between a plurality of swipe gesture directions and the number of antenna sectors by:
   positioning a reference device within a device sector of the wireless device, the reference device having a known position relative to the wireless device;
   exchanging a number of signals with the reference device using a number of beamforming settings; and
   determining a relationship between the device sectors and the number of antenna sectors based on the exchanged number of signals, wherein each of the number of antenna sectors represents a unique set of phase shift values and gain values applied to the number of antenna elements;
   activating, in response to the direction of the swipe gesture, the one of the number of antenna sectors based on the mapping between the plurality of swipe gesture directions and the number of antenna sectors;
   transmitting data to the target device using the activated antenna sector;
   detecting, using a motion sensor, a change in orientation of the wireless device; and
   updating the position table based on the detected change in orientation of the wireless device.

2. The method of claim 1, wherein the mapping indicates an orientation of the wireless device relative to the number of antenna sectors.

3. The method of claim 1, wherein each of the plurality of swipe gesture directions falls within a corresponding device sector of the wireless device.

4. The method of claim 1, further comprising:
   detecting a change in position of the target device; and
   updating the position table based on the detected change in position of the target device.

5. A wireless device, comprising:
   a touch-sensitive display;
   a number of antenna elements configured to beamform signals in a plurality of transmit directions each associated with a corresponding one of a number of antenna sectors;
   one or more processors;
   a motion sensor; and
   a memory storing one or more programs comprising instructions that, when executed by the one or more processors, cause the wireless device to:
   establish a wireless connection with a target device;
   detect a swipe gesture on the touch-sensitive display of the wireless device;
   determine that a direction of the swipe gesture on the touch-sensitive display corresponds to a current position of the target device;
   map the current position of the target device to the direction of the swipe gesture;
   store the mapping in a position table in the wireless device;
   generate a mapping between a plurality of swipe gesture directions and the number of antenna sectors by:
   positioning a reference device within a device sector of the wireless device, the reference device having a known position relative to the wireless device;
   exchanging a number of signals with the reference device using a number of beamforming settings; and
   determining a relationship between the device sectors and the number of antenna sectors based on the exchanged number of signals, wherein each of the number of antenna sectors represents a unique set of phase shift values and gain values applied to the number of antenna elements;

activate, in response to the direction of the swipe gesture, the one of the number of antenna sectors based on the mapping between the plurality of swipe gesture directions and the number of antenna sectors;

transmit data to the target device using the activated antenna sector;

detect, using the motion sensor, a change in orientation of the wireless device; and update the position table based on the detected change in orientation of the wireless device.

6. The wireless device of claim 5, wherein the mapping indicates an orientation of the wireless device relative to the number of antenna sectors.

7. The wireless device of claim 5, wherein each of the plurality of swipe gesture directions falls within a corresponding device sector of the wireless device.

8. The wireless device of claim 5, wherein execution of the instructions causes the wireless device to further:

detect a change in position of the target device; and update the position table based on the detected change in position of the target device.

9. A non-transitory computer-readable storage medium storing one or more programs containing instructions that, when executed by one or more processors of a wireless device including a number of antenna elements configured to beamform signals in a plurality of transmit directions each associated with a corresponding one of a number of antenna sectors, cause the wireless device to perform operations comprising:

establishing a wireless connection with a target device;

detecting a swipe gesture on a touch-sensitive display of the wireless device;

determining that a direction of the swipe gesture on the touch-sensitive display corresponds to a current position of the target device;

mapping the current position of the target device to the direction of the swipe gesture;

storing the mapping in a position table in the wireless device;

generating a mapping between a plurality of swipe gesture directions and the number of antenna sectors by:

positioning a reference device within a device sector of the wireless device, the reference device having a known position relative to the wireless device;

exchanging a number of signals with the reference device using a number of beamforming settings; and determining a relationship between the device sectors and the number of antenna sectors based on the exchanged number of signals, wherein each of the number of antenna sectors represents a unique set of phase shift values and gain values applied to the number of antenna elements;

activating, in response to the direction of the swipe gesture, the one of a number of antenna sectors based on the mapping between the plurality of swipe gesture directions and the number of antenna sectors;

transmitting data to the target device using the activated antenna sector;

detecting, using a motion sensor, a change in orientation of the wireless device; and updating the position table based on the detected change in orientation of the wireless device.

10. The non-transitory computer-readable storage medium of claim 9, wherein the mapping indicates an orientation of the wireless device relative to the number of antenna sectors.

11. The non-transitory computer-readable storage medium of claim 9, wherein each of the plurality of swipe gesture directions falls within a corresponding device sector of the wireless device.

12. The non-transitory computer-readable storage medium of claim 9, wherein execution of the instructions causes the wireless device to perform operations further comprising:

detect a change in position of the target device; and update the position table based on the detected change in position of the target device.

13. A wireless device including a number of antenna elements configured to beamform signals in a plurality of transmit directions each associated with a corresponding one of a number of antenna sectors, the wireless device comprising:

means for establishing a wireless connection with a target device;

means for detecting a swipe gesture on a touch-sensitive display of the wireless device;

means for determining that a direction of the swipe gesture on the touch-sensitive display corresponds to a current position of the target device;

means for mapping the current position of the target device to the direction of the swipe gesture;

means for storing the mapping in a position table in the wireless device;

means for generating a mapping between a plurality of swipe gesture directions and the number of antenna sectors by:

positioning a reference device within a device sector of the wireless device, the reference device having a known position relative to the wireless device;

exchanging a number of signals with the reference device using a number of beamforming settings; and determining a relationship between the device sectors and the number of antenna sectors based on the exchanged number of signals, wherein each of the number of antenna sectors represents a unique set of phase shift values and gain values applied to the number of antenna elements;

means for activating, in response to the direction of the swipe gesture, the one of a number of antenna sectors based on the mapping between the plurality of swipe gesture directions and the number of antenna sectors;

means for transmitting data to the target device using the activated antenna sector;

means for detecting, using a motion sensor, a change in orientation of the wireless device; and means for updating the position table based on the detected change in orientation of the wireless device.

14. The wireless device of claim 13, wherein the mapping indicates an orientation of the wireless device relative to the number of antenna sectors.

15. The wireless device of claim 13, further comprising:

means for detecting a change in position of the target device; and means for updating the position table based on the detected change in position of the target device.

* * * * *